United States Patent

[11] 3,577,928

[72] Inventor  Marcel Victorri
             Grenoble, France
[21] Appl. No.  817,488
[22] Filed  Apr. 18, 1969
[45] Patented  May 11, 1971
[73] Assignee  Merlin Gerin, Societe Anonyme
             Grenoble, France
[32] Priority  May 6, 1968
[33]          France
[31]          150757

[54] LINEAR INDUCTION MOTOR DRIVE SYSTEM
     5 Claims, 4 Drawing Figs.
[52] U.S. Cl. .................................... 104/148LM,
                                                  310/12
[51] Int. Cl. .................................... B61b 13/00

[50] Field of Search ..................................... 198/203
     (Cursory); 104/148 (MS), 23, 120, 148 (LM);
                                       180/110; 310/12, 13

[56]              References Cited
                UNITED STATES PATENTS
     3,460,485  8/1969  Easton ....................... 104/148(LM)

*Primary Examiner*—Arthur L. La Point
*Assistant Examiner*—George H. Libman
*Attorney*—Stevens, Davis, Miller & Mosher

ABSTRACT: A linear induction motor drive system comprising a stationary magnetic stator structure 28,30 having an air-gap 32 in which a magnetic traveling field drives the armature plates 24 secured to the driven vehicles 10. The armature plates are pivotally connected at 22 to the vehicles in order to allow rolling movements of the vehicles and overlapping of the armature plates in vertical inflexion zones.

Patented May 11, 1971
3,577,928
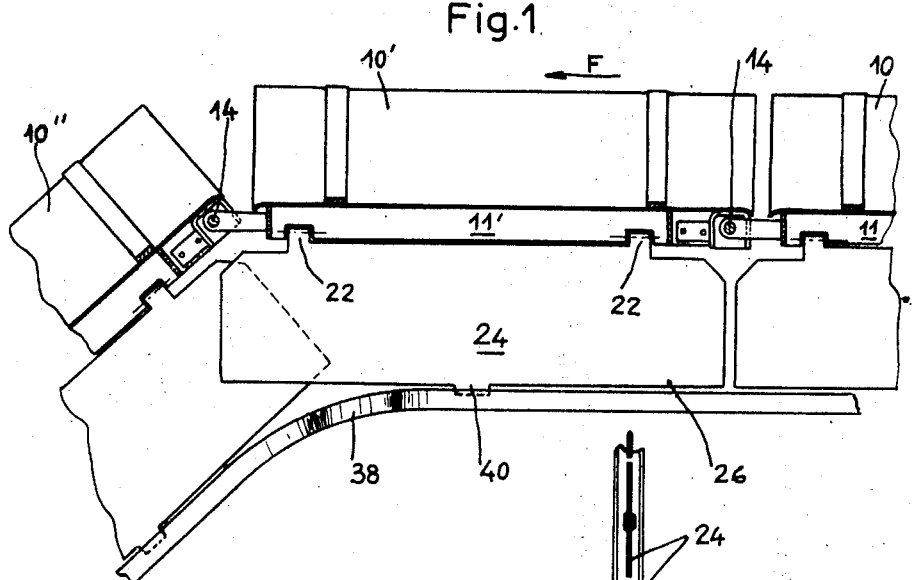
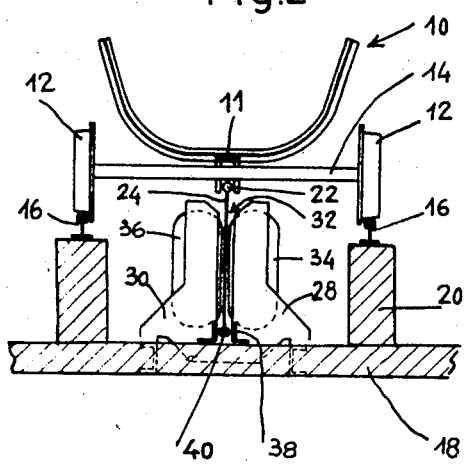
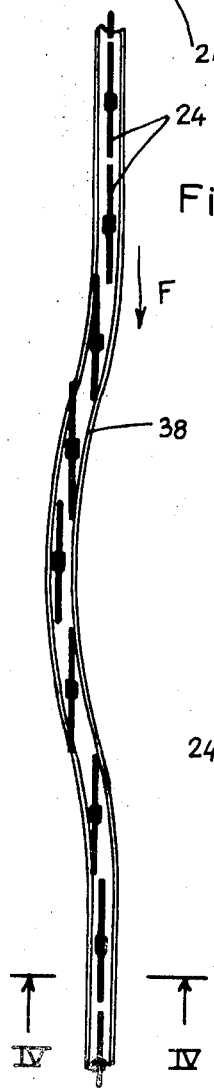
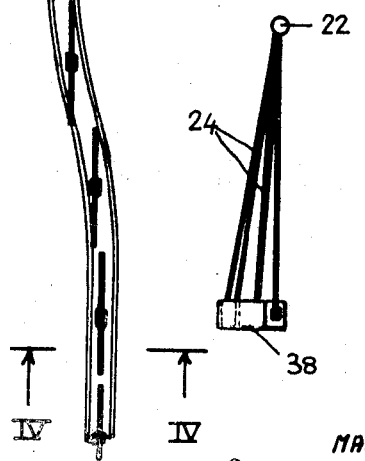
INVENTOR
MARCEL VICTORRI
By Stevens, Davis, Miller & Mosher
ATTORNEYS

LINEAR INDUCTION MOTOR DRIVE SYSTEM

The invention relates to a system for driving a vehicle along a guide trackway by means of a linear induction motor comprising an armature in the form of a longitudinal plate rigidly connected with said vehicle and cooperating with a stationary linear stator extending along the said trackway and longitudinally split into two parts separated by a gap which permits the passage of said armature.

The method of driving vehicles by a linear motor, and particularly by a linear induction motor with movable short armature cooperating with the linear stationary stator is well known and has substantial advantages both from the standpoint of simplicity, strength, flexibility, and reliability and from the standpoint of equipment. In the case of vehicles moving along a trackway by which they are guided, it is advisable to assure correct positioning of the armature and the stator so as to avoid any friction while maintaining the gap at a minimum value based on considerations of output of the motor. The driving force or thrust imparted to the vehicle by the linear motor is furthermore substantially proportional to the active armature surface that is to say to the surface subject to the action of the magnetic travelling field and it will be understood that it is advantageous to arrange the armature associated with each vehicle in such a manner as to pick up the maximum amount of energy.

The object of the present invention is to improve the known systems in order to satisfy the above requirements in a simple and effective manner.

The drive system in accordance with the invention is characterized by the fact that the armature is pivotally connected on a longitudinal axis of the vehicle.

The pivoted connection of the armature plate on the vehicle makes it possible to be independent of the effects of rolling movements of the vehicle on the position in space of the armature which fits in the very heart of the stator permitting a high efficiency.

In the event that the vehicles are connected as a train, the aligned armature plates constitute substantially a continuous plate extending over the entire length of the train and intercepting the maximum energy of the stator.

In accordance with one development of the invention which is applicable in the case of a train of vehicles, guide means associated with the said stationary stator are provided to cooperate with the said armatures and determine the angular position of the latter as a function of the topography of the trackway.

Upon a vertical inflection of the trackway resulting for instance from a bow or a turn in a vertical plane, the space between two successive juxtaposed armature plates may be insufficient for the clearance of the plates, the lateral edges of which may come against each other. A larger spacing or a truncated shape of the plates overcomes this overlapping of the plates, but to the detriment of the efficiency of the motor.

In accordance with another development of the invention, in the zones of vertical inflection of said trackway, the said guide means are disposed in zones of vertical inflection of said trackway so as to cause a transverse shift of the armatures thus permitting the overlapping of the adjacent end parts of the armatures passing through said zone. The present invention makes use of the articulation of the armature plate to the vehicle in order to divert the latter from the vertical plane and to shift it with respect to the neighboring zones. In this zone, the stator is of course interrupted, the vehicle in question being pulled or pushed by the other vehicles of the trains which are in an active zone at that time.

Other advantages and characteristics will become evident from the following description of one embodiment of the invention, given by way of illustration and not of limitation, shown in the accompanying drawing in which:

FIG. 1 is a longitudinal vertical section through a length of a bucket conveyor equipped with a drive system in accordance with the invention.

FIG. 2 is a cross section through the system of FIG. 1.

FIG. 3 illustrates in a developed plan view the guide path which causes a lateral shifting of armature plates in an inflection zone of a trackway of the conveyor of FIGS. 1 and 2.

FIG. 4 is a section along the line IV-IV of FIG. 3.

Referring to the FIGS., vehicles or buckets 10 having a chassis 11 bearing axles 14 provided with rolling members such as rollers 12 are adapted to move on a trackway consisting of rails 16 laid on small supporting walls 20 so as to provide a free space between the bottom of the buckets 10 and a bed 18. In the example shown in FIG. 1, a plurality of buckets 10, 10', 10'' are connected as a train, the chasses 11, 11' of two successive buckets 10, 10' being pivoted on one and the same axle 14, but any other manner of connection between the independent vehicles can of course be employed. A plate 24 which extends downward in the form of a keel or centerboard from the bottom of the bucket 10 is pivoted to the chassis 11 of each bucket 10 by a longitudinal axis 22. The plate 24 is of rectangular shape with a length close to that of the bucket 10 and its height is determined in such a manner that its lower edge 26 is close to the bed 18. On the two sides of the plate 24 there are arranged magnetic circuits 28, 30 which are fastened to the bed 18 and extend parallel to the trackway 16 along the trajectory of the plate 24. An interstice or gap 32 sufficient for the passage of the plate 24 is provided between the magnetic circuits 28, 30 either or both of which are wound at 34, 36 to create a magnetic travelling field which is transverse with respect to the direction of the trackway 16. The circuits 28, 30 constitute a stator, known per se, of a linear motor whose armature is formed of the plate 24 of magnetic or nonmagnetic conductive material. When the armature 24 is magnetic it is advisable to guide it so as to prevent it coming against and sticking to the stator under the influence of the forces of magnetic attraction produced by the field of the stator. A guide path 38, schematically represented by two angle irons fastened to the bed 18 but which can be developed in any other manner cooperates with a guide piece 40 borne by the lower edge 26 of the plate 24. Antifriction means, for instance roller means (not shown) limit the frictional forces resulting from this guiding, which can also be utilized for a nonmagnetic armature to avoid any accidental contact between the armature 24 and the stator 28, 30. It is easy to see that the articulation 22 of the armature 24 on the chassis 11 makes the armature independent of the swinging or rolling movements of the bucket 10, for instance resulting from differences in level of the rails 16. The influence of lateral displacements with respect to the direction of travel is also decreased and the gap 32 can therefore be reduced to a minimum.

The armatures or keels 24 which are aligned on a linear section of the trackway 16 practically join up with each other and present a maximum cross section to the stator field produced by a stator length, the conductive capacity of the keels offering optimum zones of closure to the induced currents. This results for a given section of inducer in a maximum efficiency and driving force.

Referring more particularly to FIG. 1, it will be understood that upon a vertical inflection of the trackway 16, the keels 24 of successive buckets which are aligned in the same vertical plane may touch each other and overlap. Such an inflection of the guideway may result from a change in gauge or from a turning section located at the end of the trajectory of the conveyor in order to bring the buckets onto a return trackway.

It is possible to alleviate the overlapping of the front and rear edges of the keels 24 by providing a suitable distance between them or by cutting them, but the efficiency of the drive system is affected thereby.

In accordance with an essential feature of the present invention, the guide path 38 is shifted progressively laterally in this zone of inflection in the manner illustrated in FIG. 3. A keel 24 moving in the direction indicated by the arrow F is caused to pivot gradually around the axis 22 under the action of the lateral displacement imposed by the guide path 38 on its guide member 40 as the vehicle enters into the inflection section. It is easy to see that the successive keels 24 thereby are moved through an angle (see FIG. 4) with respect to each other and any contact is thus made impossible. Upon the emergence from the inflection section of the trackway, the guide path 38 returns the keels 24 into the central position of alignment in which they can enter into the gap 32 of the stator. In the section of the angular displacement of the keels 24, the stator 28, 30 is obviously interrupted, the drive being effected by the other buckets of the train located in an active linear zone. The stator may of course comprise along the path sections which do not join up with each other but the space between the two successive sections must of course be less than the length of the train which is being driven.

The operation of the drive system in accordance with the invention is obvious:

Under the action of the magnetic travelling field produced by the stator, a thrust is applied to the armature or keel 24 located in the gap of the stator, in the direction of the trackway 16. The aligned keels 24 move continuously into the gap, the spaces between the successive keels being relatively small, and thus drive the train of buckets 10. They are guided in this displacement by the guide path 38 which positions them in the gap so as to avoid any contact or rubbing between the armature and the inductor. At the moment when a bucket comes into an inflection or turning section of the trackway 16, the guide path 38 laterally displaces the lower edge 26 of the keel 24 laterally by means of the member 40, causing it to pivot around its axis 22. This pivoting which continues for the entire inflection length imposes a staggered displacement on the successive keels, which, located respectively in different radial planes cannot come into contact. Upon emergency from the inflection section the guide path is displaced in the opposite direction so as to return the keels into their vertical position.

The invention is of course in no way limited to the embodiment which has been more particularly described and shown by way of example in the accompanying drawing, but rather it extends to any variant falling within the scope of mechanical equivalents, and particularly that in which the conveyor is of different type or in which the lateral deviation of the keels is caused by other means, such as cams borne by the keels which engage the adjacent keel displacing it.

I claim:

1. A linear induction motor arrangement for driving a body along a predetermined track, comprising a wound stationary linear induction motor stator structure shaped to define a narrow gap longitudinally extending along said track to produce when electrically energized a longitudinally moving magnetic field in said gap, a planar armature projecting from said body and adapted to travel in said gap, said magnetic field causing said armature to propel said body along said track, and pivotal connection means for hingedly connecting said planar armature to said body to allow rolling movements of said body during the traveling of said armature in said gap.

2. A linear induction motor arrangement for driving a train of coupled vehicles along a predetermined track, comprising a wound stationary linear induction motor stator structure shaped to define a narrow passageway longitudinally extending along said track to produce when electrically energized a longitudinally moving magnetic field in said passageway, a plurality of longitudinally aligned armature plates adapted to travel in said passageway, said magnetic field propelling said armature plates in said passageway along said track, each of said armature plates having a side hingedly connected for pivoting about a longitudinal axis to one of said vehicles, and guide means for said armature plates to control the angular position thereof along said track.

3. A linear induction motor arrangement according to claim 2, wherein said armature plates are arranged so as to extend, in straight sections of said track, in a common plane, in longitudinally closely spaced relation, said track comprising sections of deflection in or substantially parallel to said common plane, said guide means causing angular deflection of said armature plates out of said common plane to cause adjacent end portions of successive armature plates to overlap one another in said sections of deflection.

4. A linear induction motor arrangement according to claim 3, wherein each armature plate is of generally rectangular shape having an upper side pivotally connected to the bottom of one of said vehicles, and an opposite lower side guided by said guide means, said guide means extending stationary along said track.

5. A linear induction motor arrangement according to claim 3, wherein said stator structure is interrupted in said sections of deflection along a distance being shorter than the overall length of said aligned armature plates.